Figure 1:
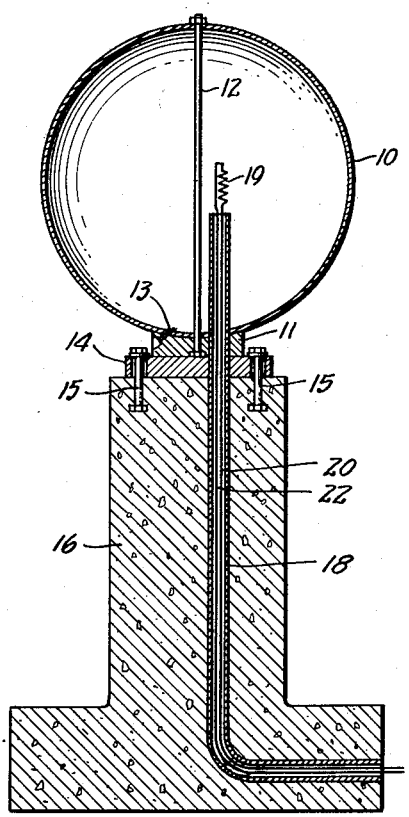

Dec. 7, 1954     B. C. TAYLOR     2,696,050

ATOMIC BOMB AIR ZERO LOCATOR

Filed Oct. 30, 1953

INVENTOR
BENJAMIN C. TAYLOR
BY
ATTORNEY

United States Patent Office

2,696,050
Patented Dec. 7, 1954

2,696,050

ATOMIC BOMB AIR ZERO LOCATOR

Benjamin C. Taylor, Falls Church, Va., assignor to the United States of America as represented by the United States Atomic Energy Commission Application October 30, 1953, Serial No. 389,509

2 Claims. (Cl. 33—1)

The present invention relates to a new and improved atomic bomb burst direction indicator suitable for civil defense purposes.

In connection with the defense of cities and other target areas against atomic attack, it is deemed of the utmost importance to determine as quickly as possible the point of detonation of a bomb so that post-attack emergency operations such as debris clearance, fire-fighting and rescue can be most effectively organized and directed.

Several devices have been proposed to give such an indication from a pattern burned or scorched on an indicating surface. One such device resembles a sun dial and has a central standard or gnomen arranged to cast a shadow on a horizontal circular plate coated with a heat scorchable material. Since the area shaded by the gnomen is not scorched, the direction of the burst is determinable. Still another device is of the "lampshade" type. These employ a standard or gnomen centrally of a frusto-conical surface. The latter is coated on the inside with a heat scorchable coating and gives an indication of the direction of the blast in a manner analogous to that of the sun dial type instrument. An example of the lampshade type of indicator is shown in the patent to Allard No. 2,615,249 entitled "Atomic Air Burst Direction Finder".

While the foregoing instruments are theoretically practical, tests of both types by the Federal Civil Defense Administration indicate that they are too subject to limitations to be practicable. For example neither of the instruments will record an explosion at or below the horizon. Even for bursts above the horizon these devices have proven unsatisfactory. In the case of the sun dial type the scorchable surface of the instrument makes a small angle with the line of incidence of the thermal energy in the event of low burst, and for the "lampshade" type the same condition exists in the event of a high burst. Consequently the thermal energy per unit area that impinges on a surface normal to the direction of radiation is spread over a large area. This reduces the intensity of the energy per unit area on the scorchable surface and a scorch pattern may not be obtained. Under test no scorching occurred on either type of instrument even at 7500 feet from ground zero.

Still another type of detector is the thermal camera type. This device consists of a box with a lens in the front side and a screen near the back, at the focal point of the lens. The screen is calibrated to give readings of azimuth and elevation from a small spot which is scorched thereon by the focused and concentrated radiation. This device, while deemed practical in principle, has a limited angle of coverage and requires a screen which is adaptable to varying intensities of heat to which it may be subjected by variation in the distance and size of the bomb.

Because of the limitations indicated, none of the instruments described has been recommended by the Federal Civil Defense Administration.

It is the object of this invention to provide a new and improved atomic bomb blast direction indicator of the thermal type which shall be capable of indicating the direction of bursts both above and below the horizon, which shall give an indication which can be easily read and interpreted by unskilled personnel, and which will function satisfactorily during periods of inclement weather.

Figure 2:
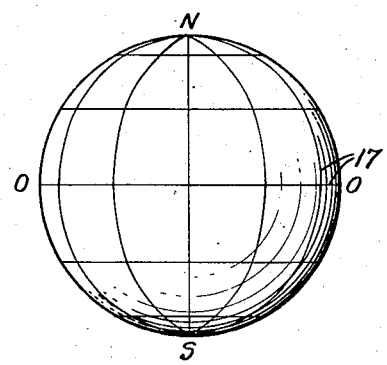

The invention may be more fully understood by reference to the accompanying drawings, wherein, Fig. 1 is a cross sectional view of a direction indicator constructed according to this invention and Fig. 2 is an elevational view of the sphere shown in Fig. 1.

With reference to the figures, the indicator comprises a sphere 10, which may be approximately 14" in diameter. The sphere should be made of a material of low thermal conductivity in order to avoid rapid conduction of heat from the point of maximum intensity on the surface of the sphere facing the point of detonation. Fiber has been found satisfactory, for this purpose, whereas metal is not recommended.

The sphere is attached to a dished block 11 by means of a rod 12 through the north-south axis of the sphere and the center of the base 11. The bottom end of the rod 12 is countersunk in the base 11 to leave a smooth under surface. The dished top of the base 11 should be coated with a caulking compound prior to setting the globe in place, to avoid entrance of water between the globe and the base.

After the globe has been set in place and secured by the rod 12, screws 13 should be inserted through the side of the base into the globe to prevent rotational movement.

After completion of the device to this stage there should be affixed to the underside of the base, with waterproof glue and brass screws, a wood sub-base 14 about 10" in diameter through which there should be drilled four holes, 90° apart, to receive anchor bolts 15. Should this device be installed in a park area a concrete pedestal 16 should be poured about 4 ft. in height with the foundation for the pedestal carried into the ground far enough, on a spread footing, to prevent heaving by frost action or movement by any normal vibratory forces. The top of the pedestal should be level and at least 12" in diameter to receive the 10" diameter sub-base of the locator, and should have inserted therein before pouring four brass or galvanized bolts spaced to fit the holes in the sub-base of the locator. Firm rubber washers should be placed over these anchor bolts and the base set in place, after which the washers and nuts may be placed on the anchor bolts. After the nuts have been turned firmly in place the device may be leveled by further adjustment of the nuts until the measured distances from the level top of the pedestal to the north, east, south and west points on the equator are equal. When setting the anchor bolts in the top of the pedestal, opposite pairs should be placed in north-south and east-west lines, magnetic or true according to the system being used in Civil Defense operational planning. The holes in the sub-base which receive the anchor bolts should be slightly larger than the bolts to permit limited adjustment of the device so that it may be oriented with reasonable accuracy toward true or magnetic north.

The globe itself, prior to mounting in the base, should be coated and marked for reading. The coating may be a dull gray lacquer or other dull coating having good weathering characteristics. Examples of other coatings that have proven satisfactory are dull black paint over an aluminum undercoat, and a heat sensitive color change paint. The coating should be applied as evenly as possible to obtain the same thickness over the entire sphere. Spraying produces better results than brush painting, especially if the sphere is rotated on the axis rod while spraying. It is important that the coating be dull or non-reflective and, unless of high thermal sensitivity, dark in color.

The marking of the sphere for reading is done with latitude and longitude lines (Fig. 2). These lines may be spaced ten, fifteen or thirty degrees apart. They may be painted on with aluminum paint after the sphere has been coated with the gray or black paint, or narrow non-corrosive metal strips 17, wires or tape may be secured to the sphere after painting. There is an advantage to metal strips, especially for the meridian lines, which may be attached more easily than the parallels of latitude, since they are not affected by the thermal energy and the sphere may then be repainted when necessary and the strips would only have to be burnished to remove the paint from their surface. If the lines are to be painted on they should first be well marked with a grooving tool. It is important to remember when attaching the sub-base to the base that the north and south meridian lines must line up with one pair of the anchor bolt holes in the sub-base so that the sphere will be properly oriented when set in place on the pedestal.

In climates where there is likelihood of ice or snow coating, the sphere it is desirable that a small resistance heating element be installed in the center thereof. A metallic electrical conduit 18 is placed in the pedestal form before pouring. The conduit extends vertically above the pedestal to a height that will place the heating element 19 in approximately the center of the sphere, taking into consideration the thickness of the base, sub-base and sphere shell, through which a hole should be drilled sufficiently large to pass the conduit and resistor. By locating this hole off-center, in line with the N-S or E-W sub-base anchor bolt holes, there will be no interference with the mounting, leveling and orienting of the locator. The heater is connected by electric leads 20, 22 to a source of current (not shown). A weather-proof key switch (not shown) may be provided in the circuit to permit turning off the heating element during above freezing weather.

The present device gives a good indication of the direction of air zero even without any longitude or latitude markings thereon since a line through the center of the scorched area and the center of the sphere points to the bomb burst. The device can also be read by measuring from the center of the scorched area to the equator along a meridian line and to the north meridian of the sphere around the equator, provided a table is set up to convert these distances from inches to degrees.

This device may be mounted on a concrete pedestal in a park area where there is no obstruction of vision to the most probable target area. It can also be mounted on a light structural steel support atop a building provided the building is of sufficiently good construction and far enough away from the most probable target that it will not be destroyed, and that access could be readily had to the instrument for reading. Since the thermal energy arrives before the blast, and the north point will be marked on the sphere, it does not matter if the blast should disturb the orientation of the sphere as long as it is recoverable for reading.

These devices should be installed near the intersections of the north-south and east-west lines of a one mile interval grid on a target area map. When they are so mounted the distance from ground zero to any two locators which should survive the blast of a nominal bomb will probably be not greater than a mile and a half. Should considerably larger bombs be used the next rows of locators should function.

Intersection of the lines of location from two or more locators will fix the air zero point in space. This "fix" can be made in the main control center by plotting the lines of position called in from the air zero locator stations of known position.

The present invention thus provides an inexpensive detector capable of recording atomic bomb bursts occurring both above and below the horizon. The provision of a heater element keeps the sphere in a dry ice free condition, thereby assuring efficient operation of this device in climates where coatings of ice or snow may be expected. Actual tests of this device have proven that it is practical and that it will give a satisfactory pattern when placed at distances of about 7500 to about 9000 feet from less than a nominal size bomb burst. The use of this type of direction indicator has been recommended by the Federal Civil Defense Administration.

I claim:

1. An atomic bomb burst direction indicator comprising a hollow sphere of fibrous material of low thermal conductivity, a dull non-reflecting heat scorchable lacquer coating on the exterior of the sphere, latitude and longitude markings on the sphere, said markings being relatively heat insensitive and indestructible by the thermal flash of an atomic explosion, a base and sub-base for the sphere, and a support for said sphere consisting of a pedestal having a top surface, anchor bolts set in said top surface, said anchor bolts being oriented in north-south and east-west lines and arranged to register with openings in the sub-base, whereby the sub-base and sphere are secured in the desired orientation.

2. An atomic bomb burst direction indicator comprising a hollow sphere of fibrous material of low thermal conductivity, a dull, nonreflecting heat sensitive lacquer coating on the exterior of the sphere, latitude and longitude markings on the sphere, said markings being relatively heat insensitive and indestructible by the thermal flash of an atomic explosion, a base and a sub-base for the sphere, a support for the sphere consisting of a pedestal having a top surface, anchor bolts set in said top surface, said anchor bolts being oriented in north-south and east-west lines and arranged to register with openings in the sub-base whereby the sub-base and sphere are secured in the desired orientation, an electric heating element mounted within the sphere, and means for connecting the heating element with a source of electricity.

References Cited in the file of this patent

UNITED STATES PATENTS

| Number | Name | Date |
|---|---|---|
| 157,586 | Devlin | Dec. 8, 1874 |
| 445,393 | Cowell | Jan. 27, 1891 |
| 740,742 | Bush | Oct. 6, 1903 |
| 892,715 | De Vilbiss | July 7, 1908 |
| 1,674,161 | De Bogory | June 19, 1928 |
| 2,615,249 | Allard | Oct. 28, 1952 |